United States Patent [19]

Fraioli et al.

[11] 4,454,207

[45] Jun. 12, 1984

[54] STEAM REFORMING OF FUEL TO HYDROGEN IN FUEL CELLS

[75] Inventors: Anthony V. Fraioli, Hawthorne Woods; John E. Young, Woodridge, both of Ill.

[73] Assignee: The United States of America as represented by the United States Department of Energy, Washington, D.C.

[21] Appl. No.: 513,523

[22] Filed: Jul. 13, 1983

[51] Int. Cl.³ .............................................. H01M 8/10
[52] U.S. Cl. ........................................ 429/17; 429/19; 429/20
[58] Field of Search .................... 429/17, 19, 20, 13, 429/40, 44, 30, 26

[56] References Cited

U.S. PATENT DOCUMENTS

| | | | |
|---|---|---|---|
| 3,536,534 | 10/1970 | Shiratori et al. | 429/20 |
| 3,677,823 | 7/1972 | Trucciola | 429/20 X |
| 3,698,957 | 10/1972 | Sanderson | 429/20 |
| 4,251,601 | 2/1981 | Russell | 429/17 |

*Primary Examiner*—Anthony Skapars
*Attorney, Agent, or Firm*—William Lohff; Robert J. Fisher; Michael F. Esposito

[57] ABSTRACT

A fuel cell capable of utilizing a hydrocarbon such as methane as fuel and having an internal dual catalyst system within the anode zone, the dual catalyst system including an anode catalyst supporting and in heat conducting relationship with a reforming catalyst with heat for the reforming reaction being supplied by the reaction at the anode catalyst.

8 Claims, 2 Drawing Figures

STEAM REFORMING OF FUEL TO HYDROGEN IN FUEL CELLS

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

The invention relates to fuel cells and more particularly to solid oxide fuel cells capable of utilizing a hydrocarbon as a source of fuel.

In general, hydrogen gas or mixtures of hydrogen and other gases have been the primary fuel supplied to the anode of solid oxide fuel cells. In some instances, hydrogen has been produced by the gasification of coal or steam reforming of liquid or gaseous hydrocarbon fuels in operations external to the cell. In addition to requiring expenditures for separate processing equipment by the external process, reforming of hydrocarbons further involves an endothermic reaction and therefore requires the addition of heat to the process.

An internal reforming process within the cell would have certain advantages. Heat generated by the electrochemical reaction at the anode catalyst to provide hydrogen ions could be used to supply at least a portion of the heat required by the reforming process. Equipment and space requirements could be reduced. However, some internal processes and reforming catalyst materials have limitations.

If the reforming process is separated from the electrochemical process, a means of transferring heat between the processes must be provided. If the anode catalyst is used both for reforming and the electrochemical conversion, its performance under reforming conditions is generally limited. As an illustration, nickel is a common anode catalyst and has some reforming properties. However, under reforming conditions, nickel on alumina will sinter and tend to form enlarged crystals thereby reducing the effective surface area of the catalyst both for reforming and as an anode catalyst.

Accordingly, one object of this invention is a fuel cell capable of using hydrocarbons as a fuel. A second object of the invention is a fuel cell with internal reforming of hydrocarbons supplied to the fuel cell. Another object of the invention is a fuel cell with internal reforming of hydrocarbon fuels with means to provide effective heat transfer between the reforming and electrochemical operations. These and other objects will become apparent from the following description.

SUMMARY OF THE INVENTION

Briefly, the invention is directed to an internal dual catalyst system within an anode zone for a fuel cell. The catalyst system includes an anode with an electrochemically active catalyst with active nickel which functions to convert hydrogen gas to hydrogen ions. A reforming catalyst is supported and thermally connected to the anode with the reforming catalyst comprising a thin porous layer of particulate spinel containing active nickel or a composition capable of generating active nickel within the cell. In the reforming process within the cell, a hydrocarbon is steam reformed to produce hydrogen and carbon monoxide at a temperature in the range of about 350°–900° C. This reaction is endothermic, and a necessary heat input is required to maintain reforming activity in the reform catalyst layer. Heat from the electrochemical reaction is transferred from the anode catalyst through the thin layer of porous spinel to the active nickel in the reforming catalyst. In the process, islands of elemental and active nickel are formed and may over a time sinter and become enlarged at the outer surface of the reforming catalyst. While this phenomena does not substantially reduce the effectiveness of the anode catalyst, it may be necessary to regenerate the reforming catalyst by periodically interrupting the operation of the fuel cell and providing an oxidizing environment to cause the nickel of the reforming catalyst to be absorbed into the spinel before its effective surface area is substantially reduced. This is followed by a reduction of the nickel in hydrogen to redistribute the catalytic metallic nickel to the spinel surface before reintroduction of the fuel. This prevents carbonization of "coking" of the spinel particles by the hydrocarbon fuel before the activated nickel surface has been regenerated.

The invention provides a number of advantages. First, the fuel cell will utilize a hydrocarbon such as methane as the fuel. Second, the reforming is carried out internally within the cell. Third, the reforming catalyst utilizes heat generated at the anode. Fourth, the reforming catalyst and the anode are combined in a compact structure reducing space requirements and providing benefits in the heat transfer operation.

DETAILED DESCRIPTION OF THE PREFERRED EMBODIMENT

Figure 1:
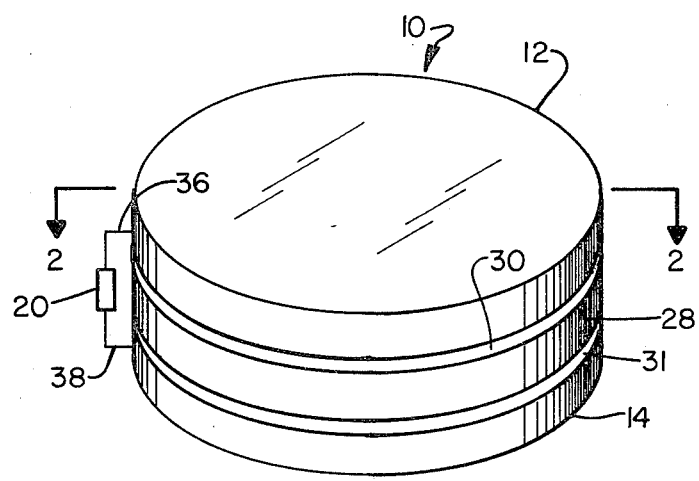
FIG. 1 is an illustration of a solid oxide fuel cell incorporating one embodiment of the invention.

The solid oxide fuel cell and particularly the solid oxide fuel cell of the invention includes a solid oxide electrolyte, an anode and a cathode separated by the electrolyte, and a reforming catalyst supported by and thermally connected to the anode opposite the electrolyte. Housing means are provided to define chambers about the anode and reforming catalyst and about the cathode. Means are provided directing the fuel gas to the reforming catalyst and an oxidant to the cathode. Preferably, the anode includes a porous nickel-based catalyst containing metallic nickel or an alloy of nickel and chromium or cobalt in a mole ratio within the range of about 80:20–95:5 and preferably 90:10 and is in intimate physical contact with an electrolyte such as the tile in a molten carbonate fuel cell, or the yttria-stabilized zirconia of the conventional solid electrolyte fuel cell, or the anode side of a manganese dioxide solid electrolyte. The metallic nickel or nickel alloy serves as the anode catalyst and furnishes electronic conductivity to conduct the electric current and transmit it to the bus bars or other collectors at the end of the cell.

The anode catalyst further supports and is thermally connected to the reforming catalyst which is exposed to the hydrocarbon fuel fed to the cell. Suitably, the reforming catalyst is a commercially available porous, nickel-based catalyst used for reforming. These include nickel-on-zirconia, nickel-on-alumina, nickel-on-magnesia and preferably a catalyst with particles of metallic nickel exposed on its surface or with the capacity to form metallic nickel on the surface by subsequent treatment within the cell.

Since nickel supported by zirconia exhibits moderate catalytic activity for steam reforming of low molecular weight hydrocarbons, the reaction rate of methane and steam over nickel-on-zirconia is approximately a factor of seven less than the rate over nickel supported by α-alumina at approximately 500° C. Accordingly, the reforming catalyst is preferably nickel on α-alumina which may be prepared by adding microcrystalline nickel aluminate spinel $NiAl_2O_4$ to a cermet. Preferably, the reforming catalyst is sprayed on the anode and by subsequent heat treatment becomes bonded to the anode. In the operation of the cell, hydrogen generated at the reforming catalyst is transported through the porous structure of the reforming catalyst to the anode catalyst.

With a reforming catalyst composed of a nickel aluminate spinel, it is usually necessary to form metallic nickel at the surface of the catalyst by introducing a hydrogen atmosphere to the catalyst for a time sufficient to form metallic nickel. Accordingly, in the initial operation of the cell, a hydrogen atmosphere is introduced to the reforming catalyst which acts to reduce the nickel in and just below the surface of the aluminate resulting in the formation of micro islands of nickel clusters (in the range of 5–20 Å) on the surface of the α-alumina (formerly aluminate) support. While there is a tendency for the nickel to sinter, this process is limited by the presence of the islands of nickel, which limit the amount of nickel at any particular site available for continued crystallite growths. Thus the loss of steam reforming activity due to nickel sintering will be minimized. With respect to the cathode for the cell, it may be a state of the art composition such as a lithiated nickel oxide.

Figure 2:
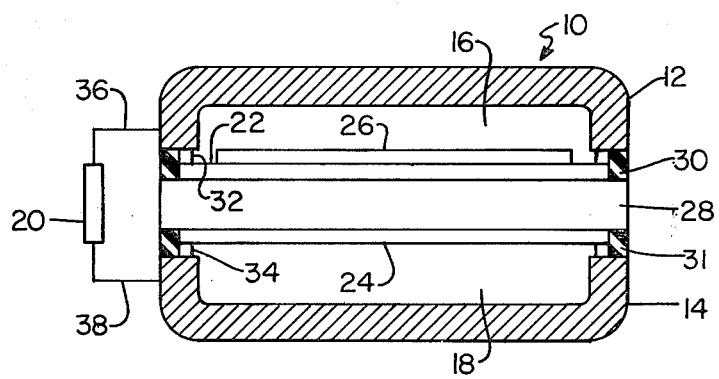
FIG. 2 is a side sectional view of the cell of FIG. 1 taken along line 2—2.

In FIG. 1, a representative fuel cell 10 is illustrated with upper and lower housing members 12 and 14 which are constructed of a conductive metal and are connected to electrical load 20 by leads 36 and 38. Flexible insulators 30 and 31 are positioned on opposite sides of electrolyte 28 (approximately 0.5–5.0 mm thick) and provide the general housing arrangement. In FIG. 2 representing a cross section of the cell, chambers 16 and 18 provide access of the fuel gas and oxidant to the respective catalyst. As illustrated, anode catalyst 22 (approximately 0.02–0.05 mm thick) is positioned in chamber 16 and includes an upper surface supporting reforming catalyst 26 of a similar thickness which is exposed to the hydrocarbon fuel. For electrical contact with housing 12, anode catalyst 22 extends beyond the reforming catalyst 26 of a similar thickness and is electrically joined to housing 12 by metallic ring 32. In a similar manner, metallic ring 34 joins cathode catalyst 24 (approximately 0.02–0.05 mm thick) to the lower housing 14.

In the process for operating the fuel cell in which the reforming catalyst is adjacent and in a heat conducting relationship with the anode, an oxidant such as oxygen or air is supplied to the cathode and a hydrocarbon fuel and steam are supplied to the reforming catalyst at a rate sufficient to generate hydrogen and to cause the hydrogen to flow to the anode catalyst. As the active nickel particles becomes excessively large reducing the effective surface area of the reforming catalyst, the oxidant is periodically substituted for the fuel to oxidize at least a portion of any elemental nickel formed on the spinel and cause the oxidized nickel to enter the porous spinel structure. Following the oxidation, hydrogen is provided to regenerate the elemental nickel. The temperature for operation of the fuel cell is about 400°–1000° C. and preferably about 600°–900° C. The temperature of the regeneration is about 350°–900° C. and preferably about 600°–900° C. and particularly about 750° C.

The foregoing description of embodiments of the invention has been presented for purposes of illustration and description. It is not intended to be exhaustive or to limit the invention to the precise form disclosed. Other modifications and variations are possible in light of the above teaching.

The embodiments of the invention in which an exclusive property or privilege is claimed are defined as follows:

1. A fuel cell comprising
   a solid electrolyte,
   an anode and a cathode separated by the electrolyte,
   a reforming catalyst supported by and thermally connected to the anode opposite the electrolyte,
   first and second housing members arranged about the electrolyte, anode, reforming catalyst and cathode to define a first chamber about the anode and reforming catalyst and a second chamber about the cathode, and
   means for directing a hydrocarbon fuel to the first chamber and an oxidant to the second chamber.

2. The fuel cell of claim 1 wherein the anode includes a catalyst and a porous structure for directing hydrogen produced by the reforming catalyst to the anode catalyst.

3. The fuel cell of claim 1 wherein the anode catalyst is composed of an alloy of nickel and chromium, and the reforming catalyst is composed of a spinel containing active nickel.

4. The fuel cell of claim 1 wherein the thin layer of reforming catalyst is bonded to the anode catalyst.

5. A process for operating a fuel cell comprising the steps of
   providing a fuel cell including an anode with a catalyst, a cathode with a catalyst, an electrolyte spaced between the anode and cathode, and a reforming catalyst adjacent and in heat conducting relationship with the anode, the reforming catalyst being composed containing active nickel.
   providing an oxidant to the cathode,
   providing a hydrocarbon fuel and steam to the reforming catalyst thereby forming hydrogen gas adjacent the anode catalyst, and
   periodically substituting an oxidant for the fuel at the reforming catalyst to oxidize at least a portion of any elemental nickel formed on the spinel and cause the oxidized nickel to enter the porous spinel structure, followed by an exposure to hydrogen gas to regenerate the elemental nickel.

6. The process of claim 5 wherein the step of providing oxidant to the reforming catalyst is carried out with an oxidant containing oxygen gas.

7. The process of claim 6 wherein the step of providing the oxidant is carried out at a temperature of about 350°–900° C. for a time sufficient to oxidize a major portion of any elemental nickel on the exposed surface of the spinel.

8. The process of claim 5 including the step of treating the reforming catalyst with hydrogen gas under reducing conditions prior to introducing the hydrocarbon fuel to the reforming catalyst.

* * * * *